Patented Jan. 11, 1927.

1,614,337

UNITED STATES PATENT OFFICE.

FRANCIS CLARKE ATWOOD, OF NEWTON, MASSACHUSETTS, ASSIGNOR TO COMSTOCK & WESCOTT, INC., OF BOSTON, MASSACHUSETTS, A CORPORATION OF MASSACHUSETTS.

METHOD OF SEPARATING FIBRINOUS MATERIAL FROM FLUIDS.

No Drawing.   Application filed April 27, 1925.   Serial No. 26,304.

This invention relates to a method of separating fibrinous material from fluids, which is particularly applicable to a method of producing certain edible protein products from animal blood.

The primary object of the invention is to provide a novel method of general utility for separating fibrinous material from fluids, and particularly from fluids containing uncoagulated fibrin, and by which any desired proportion of the fibrinous material or fibrin contained in the fluid may be removed in a convenient and practical manner without excessive occlusion of the fluid in the material being removed.

A further object of the invention is to provide a novel and improved method of defibrinating which is particularly adapted for application as a step in the general process of producing edible protein products from animal blood.

With these and such other objects in view, as may hereinafter appear, the invention consists in the methods hereinafter described and particularly defined in the claims at the end of this specification.

For certain technical purposes, and also for the production of certain edible protein products, it is desirable to separate all or portions of the fibrinous material, or fibrin from animal blood, blood plasma, and other fluids containing fibrinous material in an uncoagulated condition. As is well-known, fresh animal blood and blood plasma, unless such fluids have been specially treated, tend to coagulate into a stiff jelly-like mass within a few minutes after the withdrawal of the blood from the animal, and once started the coagulation proceeds very rapidly. In those instances in which anticoagulants, such as sodium citrate, have been employed to retard the coagulation of the fibrin, after the anticoagulant is neutralized by the addition of lime or other coagulating agent, the coagulation when once started proceeds very rapidly.

The separation of the coagulated fibrinous material, and particularly fibrin from the fluid from which it has been coagulated, without the occlusion of a considerable portion of the fluid itself within the coagulated mass, has presented a problem. In practice entrainment or occlusion of 50% of the fluid within the coagulated fibrin, is common. In accordance with one feature of the present invention a method is provided by which the fibrinous material, and particularly fibrin, may be coagulated and separated from the fluid in a practical manner without the occlusion of a considerable portion of the fluid. The improved method also permits the removal of practically any definite portion of the fibrin or fibrinous material desired.

In one application of the invention I have discovered that the coagulation of the fibrin in the various fluids containing uncoagulated fibrin, such as blood plasma or animal blood itself, may be controlled and retarded so that the coagulation may be caused to take place slowly, and for this purpose I prefer to cool the animal blood, plasma, or other fluid containing the uncoagulated fibrin, to about 50—70° F. between which temperature limits I have found that the coagulation of the fibrin starts slowly, and proceeds in such a manner that the fibrin may be separated from the fluid in a condition quite free from occluded fluid. I have further discovered that in order to obtain complete defibrination of such fluids containing uncoagulated fibrin, that it is necessary to complete the defibrination at some definite temperature, which for blood or plasma is about a temperature of 100° F., and in those instances where it is desirable to remove substantially all of the fibrin from the fluid, after the initial portions of the fibrin have been coagulated and removed, I gradually raise the temperature of the fluid from the range of 50—70° F. until a temperature of 100° F. is reached. The foregoing method of defibrinating the various fluids containing uncoagulated fibrinous material including blood plasma or blood itself, is of general utility including the production of protein products from animal blood for both technical and edible purposes, and in addition the more specific application of the foregoing method comprises an important step in the production of edible protein food products containing carefully controlled and varied proportions of fibrin for producing products having whipping qualities.

At the present time edible protein products are being produced from animal blood in accordance with a method of procedure which may be briefly described as follows: The blood is withdrawn from the animal at the time of slaughter under sterile conditions and caught in a receptacle containing an anticoagulant such as sodium citrate. Other anticoagulating agents may be used, but sodium citrate solution is that generally employed. The blood in this condition is then passed through a centrifuging machine of particular design and by which the red corpuscular matter is entirely separated from the straw yellow blood plasma, and both materials stored in separate receptacles for further treatment. The straw yellow plasma is usually further treated for the removal of all of the fibrin therefrom, and prior to my present invention this has been accomplished by maintaining such plasma at a temperature of 120°—130° F. permitting the fibrin to coagulate, after which the fibrin was separated by suitable screening apparatus. It is of commercial and practical advantage that protein products be produced from such plasma which will contain definite but variable proportions of fibrin and that the method of defibrinating be such as not to detract from the natural property of whipping upon being beaten in the manner analogous to the white of an egg.

In accordance with the present invention I have found that by chilling such plasma solution to about 50—70° F., then adding the coagulating agent such as a lime salt like calcium chloride, that the coagulation of the fibrin starts slowly and proceeds at a moderate rate, and the fibrin may be segregated in the fluid upon stirring thereby permitting it to be handled conveniently by the operator and removed in such manner as to permit the fibrin to be drained and to prevent occlusion of any very great amount of the plasma fluid. The segregation of the fibrin in this manner prevents the formation of clots or of a gelatinized mass. In producing partially defibrinated products, the fluid may thereafter be gradually raised from 50—70° F., preferably with constant stirring, until the final temperature is reached corresponding to the degree of defibrination desired.

While the invention has been described in detail as applied to a process involving the removal of fibrin from blood plasma, it is to be understood that in its broader aspects, the invention may be utilized for separating other fibrous materials of similar character.

Having thus described the invention, what is claimed is:

1. The method of defibrinating a fluid containing uncoagulated fibrin, which consists in adjusting the temperature of the fluid to below the temperature at which coagulation of the fibrin when once started takes place substantially instantaneously under a given set of conditions, to permit a portion of the fibrin to coagulate at a relatively slow rate, and separating from the fluid the fibrin thus coagulated.

2. The method of defibrinating a fluid containing uncoagulated fibrin, which consists in adjusting the temperature of the fluid to between 50 and 70° F., and permitting gradual coagulation of a portion of the fibrin to take place, separating the fibrin thus coagulated, and then gradually increasing the temperature of the fluid, and separating additional fibrin as it coagulates.

3. The method of defibrinating a fluid containing uncoagulated fibrin, which consists in causing the fluid to be brought to a temperature of approximately 50—70° F., and permitting the gradual coagulation of a portion of the fibrin to take place, and separating the fibrin thus coagulated from the fluid.

4. The method of defibrinating a fluid containing uncoagulated fibrin and to remove a predetermined portion of the fibrin, which consists in initiating the coagulation of the fibrin while maintaining the temperature of the fluid between 50 and 70° F., separating the fibrin thus coagulated and increasing the temperature of the fluid to a predetermined point corresponding to the portion of fibrin it is desired to remove.

5. The method of defibrinating plasma produced from animal blood, which consists in cooling the plasma to a temperature sufficiently low to cause the coagulation of a portion of the fibrin to take place gradually, separating the fibrin thus coagulated, and thereafter increasing the temperature of the liquid to permit additional fibrin to coagulate, and separating the same from the liquid.

6. The steps in the method of producing edible protein products in which substantially straw yellow plasma is produced from animal blood, comprising maintaining the plasma at a temperature from 50—70° F. to permit gradual coagulation of a portion of the fibrin to take place, separating the coagulated fibrin, thereafter increasing the temperature and separating additional coagulated fibrin.

7. The steps in producing edible protein products in which substantially straw yellow plasma is produced from animal blood and in which the fibrin is maintained in an uncoagulated condition by an anticoagulant, which consists in bringing the plasma to a temperature of 50—70° F., adding a coagulating agent to the plasma, and permittting a portion of the fibrin to coagulate gradually, separating the fibrin thus coagulated, and thereafter increasing the temperature and separating additional fibrin.

8. The method of defibrinating a fluid containing fibrin held in an uncoagulated condition by an anticoagulant, which consists in bringing the fluid to a temperature of 50—70° F., adding a coagulating agent, and permitting a portion of the fibrin to gradually coagulate, separating the fibrin thus coagulated, and thereafter increasing the temperature and separating additional fibrin.

9. The method of defibrinating a fluid containing fibrin held in an uncoagulated condition by an anticoagulant, which consists in bringing the fluid to a temperature below that at which substantially instantaneous coagulation of the fibrin would take place were the anticoagulant neutralized, adding a coagulating agent to the fluid while the latter is maintained at such temperature, and permitting a portion of the fibrin to coagulate gradually, separating the fibrin thus coagulated, and thereafter increasing the temperature and separating additional fibrin.

10. The method of defibrinating a fluid containing uncoagulated fibrin, which consists in coagulating the fibrin under temperature conditions which retard its coagulation to a relatively slow rate, and separating the fibrin thus coagulated.

11. The method of separating fibrinous material from a fluid containing uncoagulated fibrinous material, which consists in coagulating the fibrinous material under temperature conditions which retard the coagulation to less than the normal rate, and separating the fibrinous material thus coagulated.

12. The method of defibrinating a fluid containing uncoagulated fibrin, which consists in adjusting the temperature of the fluid to below the temperature at which coagulation of the fibrin when once started takes place substantially instantaneously, to permit a portion of the fibrin to coagulate at a relatively slow rate, stirring the fluid during coagulation, and separating from the fluid the fibrin thus coagulated.

13. The method of separating fibrinous material from a fluid containing uncoagulated fibrinous material, which consists in coagulating the fibrinous material under temperature conditions which retard the coagulation to less than the normal rate, stirring the fluid during coagulation, and separating the fibrinous material thus coagulated.

In testimony whereof I have signed my name to this specification.

FRANCIS CLARKE ATWOOD.